United States Patent [19]

Smith

[11] Patent Number: 4,645,386
[45] Date of Patent: * Feb. 24, 1987

[54] THREAD-CUTTING APPARATUS

[75] Inventor: Darrel E. Smith, Rockford, Ill.

[73] Assignee: The Ingersoll Cutting Tool Company, Rockford, Ill.

[ * ] Notice: The portion of the term of this patent subsequent to Jul. 30, 2002 has been disclaimed.

[21] Appl. No.: 760,289

[22] Filed: Jul. 29, 1985

Related U.S. Application Data

[63] Continuation of Ser. No. 575,350, Jan. 31, 1984, Pat. No. 4,531,863.

[51] Int. Cl.$^4$ ............................................. B26D 1/00
[52] U.S. Cl. ................................... 407/113; 407/48; 407/103; 407/114; 10/101 R
[58] Field of Search ................. 407/113, 103, 48, 114; 10/101 R, 111; 408/81, 215; 409/73, 71

[56] References Cited

U.S. PATENT DOCUMENTS

| | | | |
|---|---|---|---|
| Re. 30,908 | 4/1982 | Friedline et al. | 407/114 |
| 668,195 | 2/1901 | Lange . | |
| 787,582 | 4/1905 | Maloney . | |
| 1,003,066 | 9/1911 | Riblet . | |
| 1,415,339 | 5/1922 | Hall | 407/113 |
| 1,441,015 | 1/1923 | Marye | 408/217 |
| 1,843,950 | 2/1932 | Gates | 408/215 |
| 1,849,160 | 3/1932 | Walker . | |
| 2,004,333 | 6/1935 | Maurer | 10/111 |
| 2,120,621 | 6/1938 | Nell | 10/103 |
| 2,413,406 | 12/1946 | Dooling | 407/90 |
| 3,018,675 | 1/1962 | Klages et al. . | |
| 3,416,209 | 12/1968 | Contrucci et al. | 407/113 |
| 3,636,602 | 1/1972 | Owen . | |
| 3,648,341 | 3/1972 | Viellet . | |
| 3,762,005 | 10/1973 | Erkfritz . | |
| 3,829,943 | 8/1974 | Bartoszevicz et al. . | |
| 3,875,631 | 4/1975 | Malinchak . | |
| 4,281,430 | 8/1981 | Hellnick | 10/101 R |
| 4,309,132 | 1/1982 | Adamson et al. | 407/38 |
| 4,425,063 | 1/1984 | Striegl | 408/81 |

FOREIGN PATENT DOCUMENTS

| | | | |
|---|---|---|---|
| 2433 | of 1909 | United Kingdom | 407/103 |
| 596637 | 1/1948 | United Kingdom | 10/101 |
| 670814 | 4/1952 | United Kingdom | 10/111 |

OTHER PUBLICATIONS

Hybril Corp. Drawing No. C-7113 drawn Nov. 30, 1949.

Primary Examiner—Leonidas Vlachos
Attorney, Agent, or Firm—Fitch, Even, Tabin & Flannery

[57] ABSTRACT

Thread-cutting apparatus includes an indexable insert having multiple thread-cutting profiles. The invention may be embodied either in a thread-milling insert or a thread-chasing insert. The insert is configured to provide clearance for internal threading and to enable cutting force to be directed through a large cross-sectional area of the insert.

4 Claims, 10 Drawing Figures

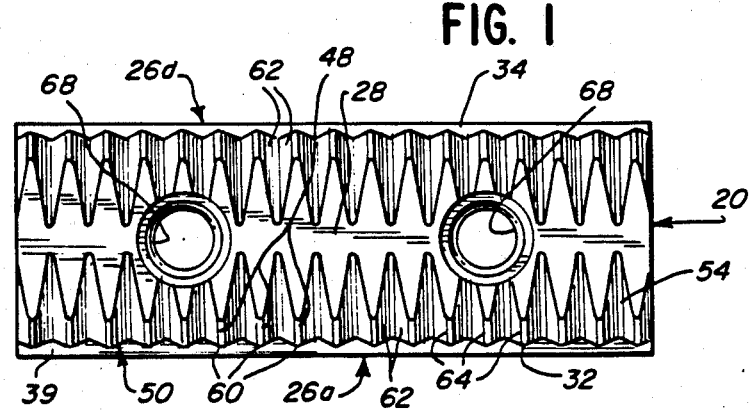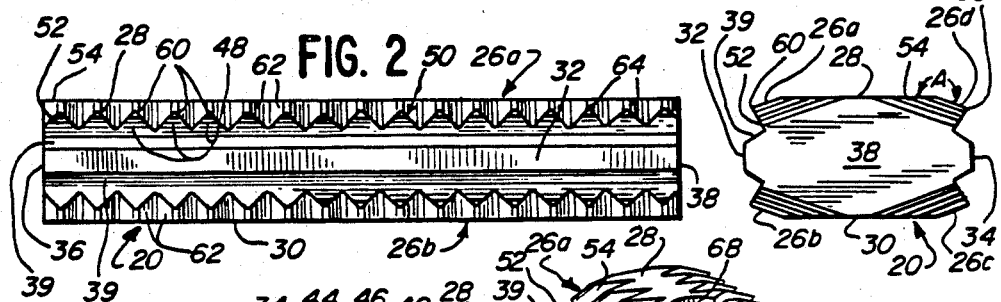

THREAD-CUTTING APPARATUS

This is a continuation of application Ser. No. 575,350, filed Jan. 31, 1984, now U.S. Pat. No. 4,531,863.

BACKGROUND OF THE INVENTION

This invention relates to cutting tools for milling and chasing threads, and to indexable inserts especially suited for such service.

Thread milling typically employs a milling cutter having a plurality of registering thread-profile cutting edges which are rotated about the cutter axis while the cutter makes a single orbit of the workpiece and advances axially through one thread lead to make a continuous thread one lead longer than the overall length of the cutting edge profile. In thread milling, each cutting edge repeatedly engages the workpiece for a relatively short time so that the complete thread is produced by a large number of relatively short cuts.

In thread chasing on the other hand, a series of superimposed continuous cuts of progressively greater depth is made along a helical path by a non-rotating cutter which is moved axially of the rotating workpiece with each cutting land of the cutting edge traversing the entire helical path.

SUMMARY OF THE INVENTION

The thread-cutting insert of the invention is adaptable to the cutting of cylindrical or conical threads on external or internal surfaces by either procedure. It provides registered multiple thread-cutting edges which are positioned on the insert to direct the cutting forces through the major dimension of the cross section of the insert for greater durability and resistance to breakage. This design is suited to avoidance of interference between the insert and the workpiece when cutting threads on interior cylindrical surfaces of relatively small diameter, and the insert may be formed to provide a thread-cutting profile of substantial length for the milling of long threads in a single orbit of the cutter. Locating surfaces formed on the insert for abutting engagement with corresponding surfaces on a holder enable the insert to be precisely positioned so that thread configurations may be produced with precision using any of the the registered cutting edges. The locating surfaces preferably define a parallelepiped, with the thread-cutting profiles disposed within the boundaries of the parallelepiped thus defined.

It is a general object of the present invention to provide a commerically useful indexable insert having as many as four separate thread-cutting profiles.

Another object of the present invention is to provide a thread-cutting insert of indefinite thread length configured to avoid generation of excessive bending moments within the insert while cutting.

An additional object of the present invention is to provide a durable thread-cutting insert which is suitable for precision work and which may be manufactured at commercially competitive costs.

Further objects of the present invention will become apparent from the following description and the accompanying drawings.

BRIEF DESCRIPTION OF THE DRAWINGS

FIG. 1 is a plan view of a milling insert in accordance with the present invention.

FIG. 2 is a side elevational view of the insert of FIG. 1.

FIG. 3 is an end elevational view of the insert of FIG. 1.

FIG. 4 is a perspective view of the insert of FIG. 1.

FIG. 5 is an end view of a milling assembly upon which four inserts of the type illustrated in FIG. 1 are mounted.

FIG. 6 is a detail view, taken in section, showing the engagement of a cutting tooth of the insert of FIG. 1 with an interior cylindrical work surface.

DETAILED DESCRIPTION OF THE PREFERRED EMBODIMENTS

Figures 7, 8, 9, 10:
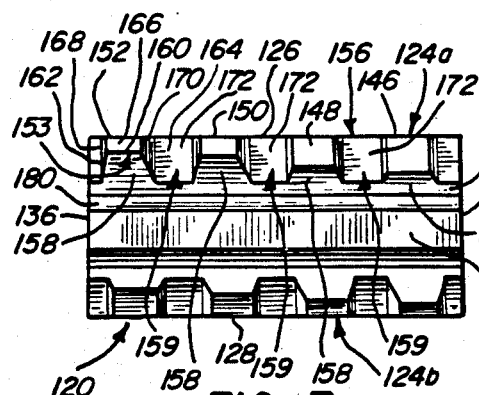
FIG. 7 is a side elevational view of a chasing insert in accordance with the present invention.
FIG. 8 is an end elevational view of the insert of FIG. 7.
FIG. 9 is a plan view of the insert of FIG. 7.
FIG. 10 is a perspective view showing the insert of FIG. 7 in installed relation on a tool holder.

The invention may take the form of a milling insert 20 (FIGS. 1-5) which may be mounted in a seat on a cutter body 22 (FIG. 5) which carries a plurality of such inserts, or the form of a chasing insert 120 (FIGS. 7-10) to be mounted singly in a turning tool cutter body 122 (FIG. 10).

In the case of the milling cutter 22 (FIG. 5), the insert includes cutting edges 26a, 26b, 26c and 26d, and the cutter body 22 is rotated about its axis 24 by the spindle of a suitable milling head and at the desired cutting speed to bring the cutting edges 26a on the respective inserts successively and repeatedly into contact with the workpiece. The cutter body 22 may be orbited about the workpiece while being advanced axially therealong to form a helical thread, or the cutter body 22 may be moved only orbitally as it is rotated and the workpiece advanced axially. Alternatively, the cutter body 22 might simply be rotated about a fixed axis and the workpiece rotated and moved axially to provide the desired relative movement.

In the case of the thread-chasing insert 120, continuous contact is maintained between a thread-cutting profile 124a on the insert 120 and the work surface. In the typical thread turning context, the holder 122 would be fixed non-rotationally and moved axially of the rotating workpiece to provide the requisite relative movement, but in a non-turning context, the holder 122 could orbit the workpiece in a helical path with the workpiece remaining fixed.

Typical known indexable tungsten carbide inserts for thread-cutting applications are of flat, wafer-like configuration with each cutting profile comprising relatively few teeth formed in the edge of the flat insert, which is indexed by rotating the insert in its own plane. As the cutting forces experienced by such inserts must be transmitted through the minor dimension of the insert, they cannot be isolated from bending stresses because the tool holder cannot support them to prevent such stress, with the result that they are relatively fragile and not well able to sustain shock loads.

In accordance with the present invention, there is provided an improved thread-cutting insert having multiple thread-cutting profiles which are oriented so that loading on the insert during use is directed through a relatively large cross-sectional dimension of the insert, providing durability and resistance to breakage.

Referring particularly to the thread-milling insert 20 of FIGS. 1–5, six locating surfaces 28, 30, 32, 34, 36 and 38 are formed on the insert 20 for abutting engagement with selected seating surfaces of the cutter body 22. As described in greater detail below, this enables the insert 20 to be precisely positioned so that thread configurations may be produced with good precision by any of the four cutting profiles 26a, b, c, and d. To enable the insert 20 to be mounted on a seat 40 providing planar support surfaces 42, 44 and 46 and to avoid generation of localized stress concentrations within the insert 20, the locating surfaces on the insert are preferably planar or substantially planar. The insert 20 is configured to avoid interference between the work surface and portions of the insert 20 other than the single cutting profile 26a in use at a particular time.

The locating surfaces 28, 30, 32, 34, 36 and 38 are preferably arranged in three parallel pairs each perpendicular to each of the other pairs, with their respective planes thus defining a parallelepiped. Each of the thread-cutting profiles 26a, b, c and d of the insert 20 is disposed within the interior of the parallelepiped, which permits the mounting of the insert 20 in the seat 40 of the cutter body formed by three orthogonally related rectangular surfaces, without engagement of the seat 40 by any one of the thread-cutting profiles.

Each of the four thread-cutting profiles 26a, b, c and d comprises a plurality of substantially identical thread-cutting teeth 48. The teeth collectively present a serrated cutting edge 50 defined at the intersection of a generally planar forward cutting surface 52 and a grooved back surface 54. During use, the rotation of the cutter body 22 drives the forward cutting surface 52 forwardly into the workpiece so that it penetrates the work surface, a fragmentary portion of which is illustrated at 56 in FIG. 6, over a short distance to remove relatively small chips 58, and then disengages itself from the work surface 56, to be followed by the cutting surface of the succeeding insert of the rotating tool body.

Each tooth 48 has an apex 60 at the point radially outermost from the axis 24 of the cutter body 22. The tooth apices 60 define a line on each cutting edge 50 which is substantially parallel to the axis of rotation 24 of the cutter body 22. The grooved back surface 54 of each cutting profile 26a, b, c and d forms the sides 62 of the teeth 48 and a series of generally linear ridges or peaks 64 extending rearwardly from the apices 60 of the teeth.

For convenience of description and notwithstanding the fact that the insert 20 can be oriented in any of four different positions relative to its associated seat 40 during use, the cutting profile in working position will be denoted by the reference character "26a", and the locating surface 28 contiguous with the back surface 54 of the cutting profile 26a in working position will be referred to as the top locating surface 28 of the insert. The opposite parallel locating surface 30, which is identical thereto, will be referred to as the bottom locating surface 30. The locating surface 32 adjacent the forward cutting surface 52 will be referred to as the forward locating surface 32, and the opposite parallel surface 34 which engages the seat will be referred to as the rear locating surface 34. The remaining locating surfaces 36 and 38 will be referred to as the end locating surfaces. The forward and rear locating surfaces 32 and 34 herein are identical to one another, as are the respective end surfaces 36 and 38.

The insert 20 is symmetrical about three orthogonal axes: a primary axis perpendicular to the end surfaces 36 and 38; a major transverse axis perpendicular to the forward and rear surfaces 32 and 34; and a minor transverse axis perpendicular to the top and bottom surfaces 28 and 30.

To provide clearance between the cutting profile 26d adjacent the top locating surface 28 and behind the cutting profile 26a in use and the work surface, the tooth peaks 64 define an included angle A of greater than 180° with the top locating surface 28. In the illustrated insert, this angle is about 200°. The vector labeled "F" in FIG. 6 represents the force exerted on the cutting edge 50 by its engagement with the workpiece at a particular point in its travel therethrough. One advantage provided by the insert herein is that its configuration enables cutting forces to be directed generally toward the center of the insert or in a direction generally parallel to the major transverse axis of the insert, which prevents the generation of unacceptably high bending moments within the insert under operating conditions.

A substantially planar surface 39 extends obliquely between the forward cutting surface 52 of cutting profile 26a and the forward locating surface 32 parallel to the longitudinal axis of the insert.

In the illustrated insert, the dimension along the major transverse axis, i.e., the distance between the forward and rear locating surfaces 32 and 34, is approximately twice that of the distance along the minor transverse axis, i.e., the distance between the top and bottom locating surfaces 28 and 30. In one particular insert, these dimensions are about ¾ in. and about ⅜ in. respectively.

Referring to FIG. 5, the cutter body 22 herein has four seats 40 of generally L-shaped cross section, each of which is adapted for mounting of one insert 20. Each seat 40 includes a bottom surface 42 for supporting the bottom locating surface 30 of the insert and a back support surface 44 for supporting the rear locating surface 34 of the insert. Each seat 40 also includes an end support surface 46 for cooperation with one of the end locating surfaces 38 of the insert. The seats 40 are disposed at evenly spaced intervals about the circumference of the cutter body 22.

For cutting a straight thread, the cutter body 22 is positioned adjacent a work surface of generally circular cross section having its longitudinal axis disposed substantially parallel to that of the holder and the cutter body 22 is rotated to bring the cutting profiles 26a of the inserts 20 successively into cutting engagement with the work surface, which may be either the inner or the outer surface of a cylindrical body, tube or shell.

In the illustrated cutter body 22, two threaded sockets 65 are formed in the bottom surface of each seat to accommodate a pair of screws 66 extending through a pair of countersunk bores 68 in the associated insert. The screws clamp the insert against the bottom seat surface 42. The threaded sockets 65 are angled slightly rather than perpendicular to the bottom seat surfaces 42 so that tightening of the screws 66 urges the rear locating surfaces 34 and/or the end locating surfaces 36 against their associated seat surfaces 44 and 46.

In the illustrated embodiment, shims 70 are provided between the bottom locating surfaces 30 of the respective inserts and their respective associated bottom seat surfaces 42. This enables the seats 40 to be formed without precise tolerances on the bottom support surfaces 42, because the shims 70 may be used to provide dimensional precision. Shims 70 may also be used on the end surfaces 46.

As explained in greater detail below, relative axial movement is effected between the workpiece and the tool cutter body 22 in conjunction with relative orbital movement during milling to produce a helical thread. To avoid interference between the sides 62 of the teeth 48 and the workpiece due to the axial advancement, the cutting profiles 26 of the insert 20 are preferably configured so that the peak 64 of each tooth 48 forms an acute angle with the forward cutting surface 52, and the sides 62 of the teeth 48 are parallel to the peaks. In the illustrated embodiment, the tooth peaks intersect the forward cutting surface at an angle of about 83°. It will be appreciated that in other embodiments of the invention, the angle between the tooth peaks 64 and the forward cutting surface 52 may be larger or smaller, depending on the material of the workpiece, the diameter of the work surface, and the desired radial rake. If the angle is too small, the tooth may be overly susceptible to breakage. Accordingly, the angle must be selected to provide clearance between the sides of the teeth and the workpiece without being so small that the strength of the teeth is insufficient.

In manufacturing the insert described above, the teeth 48 may be formed by a series of parallel straight grinds. The grinds preferably are made substantially perpendicular to the primary axis of the insert, the material of which is typically a carbide of tungsten sintered in a matrix of softer metal.

Turning to a description of thread milling of long pipe as an example, the milling head provides an orbiting spindle for rotating the cutter body 22 about its axis 24 at suitable cutting speed. The milling head includes means for effecting axial movement of the spindle through the desired thread lead on a single orbit, that lead being typically one pitch, i.e., the distance between the apices 60 of a pair of adjacent teeth 48, but which could be an integer multiple of the thread pitch for milling multiple threads.

The insert 20 of the present invention has a configuration which enables a relatively large number of thread-cutting teeth 48 to be included on a single, relatively long cutting profile. The milling insert 20 has a number of teeth 48 equal to the number of single-thread turns desired so that the entire thread may be milled during one orbit of the cutter body 22. The illustrated insert 20 has 17 teeth on each cutting profile, and measures about 2⅛ in. along its primary axis.

Referring particularly to FIG. 6, which shows the cutting action of a single tooth 48 cutting an internal thread on an interior cylindrical work surface 56, the insert 20 is shown during a climb cut, i.e. with the cutting edge 50 entering the workpiece at a previously uncut portion 72 of the work surface 56 and exiting the workpiece adjacent the finished portion 74 of the work surface. Climb cutting is generally preferable for the insert 20 described above, but the insert may also be used for opposite feeding.

The thread-chasing embodiment of the present invention is illustrated in FIGS. 7–10. The thread-chasing insert 120, like the thread-milling insert 20, includes four thread-cutting profiles 124a, b, c and d which are oriented to insure that cutting force on the insert 120 is directed through a relatively large cross sectional dimension of the insert to enhance its durability and resistance to breakage. The insert has six locating surfaces 126, 128, 130, 132, 134 and 136 for abutting engagement with corresponding surfaces 138, 140 and 142 on its associated holder 144 to enable the insert to be precisely positioned, and the locating surfaces are preferably generally planar. Also, like the thread-milling insert 20, the thread-chasing insert 120 is configured to avoid interference between a work surface and portions of the insert other than the single cutting profile 124a in use at a particular time.

The locating surfaces 126, 128, 130, 132, 134 and 136 are similarly arranged in three parallel pairs each perpendicular to the surfaces in each of the other pairs so that the intersections of the planes of the six locating surfaces define a parallelepiped. Each of the thread-cutting profiles 124a, b, c and d is disposed within the interior of the parallelepiped thus defined, which enables mounting of the insert in a seat 145 formed by three intersecting orthogonal rectangular surfaces 138, 140 and 142, as shown in FIG. 10, without engagement of the seat 145 by any of the thread-cutting profiles 124a, b, c and d.

Each of the four thread-cutting profiles 124a, b, c, and d comprises a plurality of thread-cutting teeth 146, 148, 150 and 152 which are graduated in height. The teeth 146, 148, 150 and 152 in each profile collectively present a serrated cutting edge 153 defined at the intersection of a generally planar forward cutting surface 154 and a grooved back surface 156. During use, relative motion between the workpiece and the holder 144 drives the cutting surface 154 into the work surface.

For convenience of description, the cutting profile in working position will be denoted by the reference character 124a, and the locating surface contiguous with the back surface 156 of the cutting profile 124a in working position will be referred to as the top locating surface 126 of the insert. The opposite parallel locating surface 128, which is identical thereto, will be referred to as the bottom locating surface 128. It will be appreciated that the terms "top" and "bottom" are not descriptive of the position of the insert in FIG. 10, but have been selected to facilitate description. The locating surface 130 adjacent the forward cutting surface will be referred to as the forward locating surface 130, and the opposite parallel surface which engages the seat will be referred to as the rear locating surface 132. The remaining pair of parallel locating surfaces 134 and 136 will be referred to as the end locating surfaces 134 and 136. The forward and rearward locating surfaces 130 and 132 herein are identical to one another, as are the respective end surfaces 134 and 136.

Again, insert 120 has three orthogonal axes: a primary axis perpendicular to the end surfaces 134 and 136; a major transverse axis perpendicular to the forward and rear surfaces 130 and 132; and a minor transverse axis perpendicular to the top and bottom surfaces 126 and 128.

As the illustrated insert 120 is configured to form a buttress thread, the cutting face 158 of each of the teeth 146, 148, 150 and 152 is of generally trapezoidal, non-symmetrical cross section. Between the teeth are channels 159 of generally trapezoidal, non-symmetrical cross section.

Each tooth has a primary cutting edge 160 and two side cutting edges 162 and 164. Extending rearwardly from the primary cutting edge 162 is a rectangular substantially planar ridge or land 166. The rear end of the land 166 intersects the top locating surface 126 of the insert 120. Extending rearwardly from each of the side cutting edges of the tooth are side surfaces 168 and 170.

For purposes of clarity, only one tooth 166 in the drawings has been assigned the above reference characters 150, 152, 164, 166, 168 and 170. However, the above description applies to all of the teeth 146, 148, 150 and 152 in each of the thread-cutting profiles 124a, b c and d.

Referring particularly to FIG. 8, the lands extending rearwardly from the primary cutting edges 160 of the various teeth in each cutting profile are parallel. An included angle A is defined at the intersection of each of the lands with the adjacent locating surface 126. For purposes of providing clearance and directing cutting force through a major cross sectional dimension of the insert, angle A is greater than 180°. In the illustrated embodiment, the value of angle A is about 208°.

Between each pair of adjacent teeth is a generally planar surface 172 which forms the bottom of the channel 159 between the teeth. The surfaces 172 are coplanar and parallel to the lands 166, and intersect the top locating surface 126.

Referring to FIG. 10, the holder 122 has a seat 145 which comprises a bottom surface 138 for supporting the bottom locating surface 128 of the insert, a back support surface 140 for supporting the rear locating surface 132 of the insert, and an end surface 142 for cooperation with the end locating surface 136 of the insert. It will be appreciated that the cutting forces are directed substantially toward the bottom and back support surfaces 138, 140 of the seat.

The insert 120 is secured to the holder 122 by means of a screw 174 or the like extending through a countersunk bore 176 in the insert. The minor transverse axis of the insert is coincident with the axis of the bore 176. The bottom surface 138 of the seat 145 has a threaded socket 178 formed in it to accommodate the screw 174. The threaded socket 178 is preferably angled slightly rather than perpendicular to the bottom seat surface 138 to effect crowding of the insert 120 so that tightening of the screw 174 urges the rear locating surface 132 and/or the end locating surface 134 against their associated seat surfaces 140 and 142.

It will be appreciated that the thread-chasing insert described above may be manufactured by a number of straight grinds. The channels 159 between the teeth are of uniform cross section through their respective lengths. The forward cutting surface 154 and the adjacent surface 180 which extends between the forward cutting surface 154 and the forward locating surface 130 are substantially planar and can be formed in a single grinding operation by a straight grind. Furthermore, the surfaces 154 and 180 on cutting profile 124a may be formed simultaneously with the corresponding surfaces on cutting profile 124b in a single straight grind with a suitably configured grinding wheel, as may the corresponding surfaces on cutting profiles 124c and 124d.

Turning to a description of the manner of operation of the thread-chasing insert 120 described above, the insert is preferably canted slightly with respect to the axis of the workpiece so that the primary axis of the insert is perpendicular to the direction of relative movement between the workpiece and the insert.

During use, the shortest tooth 146 of the cutting profile 124a is the first to engage the workpiece and removes the outermost portion of the work surface as it travels through the first turn of the helix, cutting a relatively shallow helical channel. As the shortest tooth 146 begins cutting the second turn of the helical thread, the second shortest tooth 148 engages the workpiece and deepens the channel formed by the first tooth 146. This progression continues as the remaining teeth 150 and 152 successively enter the workpiece. To distribute the cutting forces relatively evenly over the cutting profile of the insert, the differences in height between adjacent teeth are adjusted so that each tooth removes approximately the same amount of material from the workpiece.

From the foregoing, it will be appreciated that the present invention provides novel and improved thread-cutting inserts. While two preferred embodiments have been described and illustrated in the accompanying drawings, there is no intent to limit the scope of the invention to these or any other particular embodiments.

What is claimed is:

1. An indexable insert for mounting on a holder to form a continuous helical thread on a workpiece surface, the insert comprising:
    at least two rows of cutting teeth, each said row of cutting teeth including a substantially planar forward cutting surface and a grooved back surface intersecting said forward cutting surface to define a cutting edge, said grooved back surface having a plurality of parallel grooves therein defining a row of parallel ridges extending rearwardly of said forward cutting surface,
    a bore extending through said insert and located rearwardly of both of said two rows of cutting teeth;
    a substantially planar bottom locating surface substantially perpendicular to the axis of said bore;
    a pair of opposite, substantially parallel, substantially planar side locating surfaces, each being substantially perpendicular to said bottom locating surface and being substantially parallel to the axis of said bore; and
    substantially parallel forward and rear locating surfaces oriented perpendicular to said bottom and side locating surfaces;
    each of said ridges being inclined with respect to said bottom locating surface.

2. An insert in accordance with claim 10 wherein said bore is countersunk at both ends and centered between said rows of cutting teeth.

3. An insert in accordance with claim 1 wherein each of said rows of teeth is graduated in height.

4. Milling apparatus comprising:
    a plurality of indexable milling inserts;
    a rotatable cutter body having a plurality of seats for supporting said inserts in predetermined positions; and
    means for releasably attaching said inserts to said rotatable cutter body;
    each of said inserts comprising:
    at least two rows of cutting teeth, each said row of cutting teeth including a substantially planar forward cutting surface and a grooved back surface intersecting said forward cutting surface to define a cutting edge, said grooved back surface having a plurality of parallel grooves therein defining a row of parallel ridges extending rearwardly of said forward cutting surface;
    a bore extending through said insert and located rearwardly of both of said two rows of cutting teeth;
    a substantially planar bottom locating surface substantially perpendicular to the axis of said bore;

a pair of opposite, substantially parallel, substantially planar side located surfaces, each being substantially perpendicular to said bottom locating surface and being substantially parallel to the axis of said bore; and substantially parallel forward and rear locating surfaces oriented perpendicular to said bottom and side locating surfaces;

each of said ridges being inclined with respect to said bottom locating surface.

* * * * *